US012608595B2

(12) United States Patent
Ghosh et al.

(10) Patent No.: US 12,608,595 B2
(45) Date of Patent: Apr. 21, 2026

(54) METHOD FOR REDUCING BIAS IN DEEP LEARNING CLASSIFIERS USING ENSEMBLES

(71) Applicant: Hitachi, Ltd., Tokyo (JP)

(72) Inventors: Dipanjan Ghosh, Santa Clara, CA (US); Ahmed Farahat, Santa Clara, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 666 days.

(21) Appl. No.: 18/100,455

(22) Filed: Jan. 23, 2023

(65) Prior Publication Data

US 2024/0249112 A1    Jul. 25, 2024

(51) Int. Cl.
G06N 3/045 (2023.01)
G06N 3/082 (2023.01)
(52) U.S. Cl.
CPC ............. G06N 3/045 (2023.01); G06N 3/082 (2013.01)
(58) Field of Classification Search
CPC ............................... G06N 3/045; G06N 3/082
See application file for complete search history.

(56) References Cited

U.S. PATENT DOCUMENTS 9,239,986 B2 * 1/2016 Lin ........................ G06N 20/00

OTHER PUBLICATIONS

Md, et al., "A dynamic ensemble learning algorithm for neural networks", Neural Computing and Applications (2020) 32:8675-8690, 2020 (Year: 2020).*
Zou, J. et al., "Design AI so that it's fair," Nature, vol. 559, Jul. 12, 2018, pp. 324-326; 3 pages.
Prost, F. et al., "Mitigating Unfair Bias in ML Models with the MinDiff Framework," Google Research, Nov. 16, 2020; 5 pages.
AI Explorables, PAIR, <https://pair.withgoogle.com/explorables/>; 7 pages, retrieved Feb. 1, 2023.

* cited by examiner

*Primary Examiner* — Tsu-Chang Lee
(74) *Attorney, Agent, or Firm* — PROCOPIO, CORY, HARGREAVES & SAVITCH LLP

(57)    ABSTRACT

Example implementations described herein are directed to systems and methods for generating a model ensemble to reduce bias, the method involving training a plurality of machine learning models from data, each of the plurality of machine learning models trained from a first subset of the data and validated from a second subset of the data, each of the first subset and the second subset being different for each of the plurality of machine learning models; determining accuracy of each of the plurality of machine learning models based on validation against the second subset of the data; pruning the plurality of machine learning models based on the accuracy to generate a subset of the plurality of machine learning models; and forming the model ensemble from the subset of the plurality of machine learning models.

13 Claims, 9 Drawing Sheets

| Layer | Number of layers | Number of Nodes in each layer |
|---|---|---|
| LSTM | 1 | 512 |
| FC₁ | 1 | 512 |
| FC₂ | 2 | 256 |

MODEL INFERENCE

MODEL TRAINING

| Data | Dataset1 | | | Dataset2 | | | Dataset3 | | |
| --- | --- | --- | --- | --- | --- | --- | --- | --- | --- |
| | D1 | D2 | D3 | D1 | D2 | D3 | D1 | D2 | D3 |
| Classes | 9 | 9 | 10 | 99 | 99 | 100 | 9 | 9 | 10 |
| Training | 24.4K | 30.5K | 32.5K | 37.5K | 46.9K | 47.4K | 683.2K | 768.6K | 910K |
| Validation | 4500 | 4500 | 4500 | 4950 | 4950 | 4950 | 10K | 10K | 10K |
| Testing | 4500 | 4500 | 4500 | 4950 | 4950 | 4950 | 50K | 50K | 50K |
| Model | ResNet20 | | | ResNet56 | | | fastText | | |
| Epochs | 200 | | | 200 | | | 200 | | |
| Initial-lr | 1e-03 | | | 1e-03 | | | 1e-03 | | |

| | Dataset1 | | Dataset2 | |
|---|---|---|---|---|
| Accuracy (%) | Majority | Minority | Majority | Minority |
| SingleBase | 91.05 | 83.23 | 69.54 | 37.58 |
| Ext-Bagging | 93.82 | 86.80 | 77.62 | 44.34 |
| Snapshot | 93.62 | 85.79 | 77.47 | 46.22 |
| DynSnap-cyc | 94.15 | 86.44 | 77.89 | 45.00 |
| DynSnap-step | 93.95 | 86.54 | 77.09 | 44.45 |

FIG. 3(C)

METHOD FOR REDUCING BIAS IN DEEP LEARNING CLASSIFIERS USING ENSEMBLES

BACKGROUND

Field

The present disclosure is generally directed to deep learning systems, and more specifically, to reducing bias in deep learning classifiers through the use of ensembles.

Related Art

Equipment uptime has become increasingly more important across different industries which seek for new ways to increase equipment availability. By using predictive maintenance, one can increase equipment availability, improve the safety of operators, and reduce the environmental incidents. Maintenance is a process where the objective is to keep the equipment in a working, efficient and cost-effective condition. The maintenance process is conducted by performing the necessary actions on the equipment to achieve one or more of these objectives. These actions include, but are not limited to, the inspection, tuning, repair and overhaul of the equipment or its components.

When complex equipment experiences a failure, it is sometimes difficult and time-consuming to diagnose the equipment, identify the root cause of the problem, and decide what repair actions need to be conducted to fix the equipment. Data generated during the maintenance operations can be used to develop data-driven systems for predictive maintenance that guided the maintenance staff on how to repair equipment when it is sent for repair. Deep learning or neural network model-based systems have been proposed for such systems, considering their ability to learn from massive amounts of data, different modalities of data and flexibility in developing different architectures.

Although highly successful, the deep learning models can suffer from issues of bias arising from the model training algorithm as well as bias present in the data. The resulting models of such data and processes produce biased predictions that reduce the quality of the predictions, are not generalized, and also cause ethical issues. The same is true for other data-driven deep learning-based systems such as medical diagnosis and patient care recommendation systems, where biased output can have serious consequences.

Addressing bias has involved efforts mainly in three categories—reducing data bias, reducing algorithmic bias, and building audit tools to inspect data and algorithmic bias. A majority of the effort and focus has been towards understanding and reducing data bias. Towards this end, there has been concentrated efforts to highlight how data is collected, processed, as well as organized to address data bias. Similarly, there has been concentrated efforts in modifying machine algorithms to make them robust and make them explainable. Examples of algorithmic efforts include a regularization technique for effectively and efficiently mitigating unfair biases when training ML models. Another effort has been made towards the development of auditing tools. It should be noted that addressing bias is a very difficult task especially to address it holistically. Hence, all efforts most of the time focus on a certain aspect of it.

SUMMARY

Example implementations described herein are focused on algorithmic effort. However, the key difference is not to modify the training algorithm or architecture, but instead intelligently leverage the existing training algorithm and architecture to form ensembles that guarantee reduction in certain types of bias—representation bias, aggregation bias and Simpson's paradox. It is therefore an object of the present disclosure to facilitate a mechanism with a foundation in deep learning/neural networks for developing a method to address the above biases.

The problem to be solved by the present disclosure is to develop a deep learning classification model that is immune to representation bias (represented by imbalanced classes), aggregation bias and Simpson's paradox. Aggregation bias and Simpson's paradox in the worst-case scenario are showcased by producing inconsistent outputs for the same input for two versions of the model when re-trained, even though the overall aggregate accuracy of the model is similar/the same. Neural Networks (NN) training procedure inherently has randomness, which causes the optimization procedure to get stuck in a low-optima during the training process. Compounding this issue is the representation bias in the form of imbalanced classes present in the data. These two issues are the primary causes of generating biased predictions where the biases are representation bias, aggregation bias, and Simpson's paradox.

Example implementations described herein involve optimizing the network parameters using an efficient mechanism to create multiple models forming an ensemble that is ultimately used for making predictions. This is in contrast to using a single model for predictions. Neural network models can take long time to train; however, the example implementations described herein do not increase time to create an ensemble. The time required to create a single model and an ensemble remain the same using the example implementations described herein.

The resulting method is immune to the aforementioned biases and hence produce improved quality models and predictions. The system to recommend a course of repair actions, failure prediction, and/or defect identification using visual inspection are problems modelled as a classification problem wherein the labels are obtained from historical data. The system to create an ensemble of models to address aforementioned bias is not restricted to the system of recommending repair actions, or failure prediction, but is also applicable for all problems modelled as classification and using NN as the algorithm. In the present disclosure, the terms Neural Networks (NN) and Deep Learning (DL) are considered to be equivalent.

Example implementations described herein involve a deep learning model with reduced biases as defined by representation bias, aggregation bias and Simpson's paradox. The example implementations described herein involve a system with basis in NN/DL to address representation bias, aggregation bias and Simpson's paradox by using multiple models together, i.e., an ensemble of models. The system will provide a mechanism to combine outputs from multiple models in the ensemble to create a single output.

Example implementations described herein further involve a dynamic creation of multiple trained models efficiently forming an ensemble of models to reduce representation bias, aggregation bias and Simpson's paradox. With the assumption that the problem to recommend a course of repairs has been modelled as a classification problem with the presence of historical repair data, example implementations described herein involve a system that will dynamically create multiple models to form an ensemble. The system also works for the assumption that a problem has been modelled as a classification problem in general and has historical data (for example, an image classification problem). Based on the input specification (base architecture stack-up), the system will create the network architecture that can involve one or more of Convolutional Neural Network (CNN), Long-Short Term Memory (LSTM), multi-layer fully connected neural network (MNN), and/or any combination of CNN, LSTM, and MNN.

The system has two basic variations to create multiple models. In a first variation, there is the sampling of multiple models during the model training procedure by using a cyclic schedule, for training models being trained using different random initializations on different subsets of data. In a second variation, there is the sampling of multiple models during the model training procedure by using a step schedule, for training models being trained using different random initializations on different subsets of data.

Aspects of the present disclosure can involve a method for generating a model ensemble to reduce bias, the method involving training a plurality of machine learning models from data, each of the plurality of machine learning models trained from a first subset of the data and validated from a second subset of the data, each of the first subset and the second subset being different for each of the plurality of machine learning models; determining accuracy of each of the plurality of machine learning models based on validation against the second subset of the data; pruning the plurality of machine learning models based on the accuracy to generate a subset of the plurality of machine learning models; and forming the model ensemble from the subset of the plurality of machine learning models.

Aspects of the present disclosure can involve a computer program, storing instructions for generating a model ensemble to reduce bias, the instructions involving training a plurality of machine learning models from data, each of the plurality of machine learning models trained from a first subset of the data and validated from a second subset of the data, each of the first subset and the second subset being different for each of the plurality of machine learning models; determining accuracy of each of the plurality of machine learning models based on validation against the second subset of the data; pruning the plurality of machine learning models based on the accuracy to generate a subset of the plurality of machine learning models; and forming the model ensemble from the subset of the plurality of machine learning models. The instructions and computer program can be stored on a non-transitory computer readable medium and executed by one or more processors.

Aspects of the present disclosure can involve a system for generating a model ensemble to reduce bias, the system involving means for training a plurality of machine learning models from data, each of the plurality of machine learning models trained from a first subset of the data and validated from a second subset of the data, each of the first subset and the second subset being different for each of the plurality of machine learning models; means for determining accuracy of each of the plurality of machine learning models based on validation against the second subset of the data; pruning the plurality of machine learning models based on the accuracy to generate a subset of the plurality of machine learning models; and means for forming the model ensemble from the subset of the plurality of machine learning models.

Aspects of the present disclosure can involve an apparatus involving a processor configured to train a plurality of machine learning models from data, each of the plurality of machine learning models trained from a first subset of the data and validated from a second subset of the data, each of the first subset and the second subset being different for each of the plurality of machine learning models; determine accuracy of each of the plurality of machine learning models based on validation against the second subset of the data; pruning the plurality of machine learning models based on the accuracy to generate a subset of the plurality of machine learning models; and form the model ensemble from the subset of the plurality of machine learning models.

BRIEF DESCRIPTION OF DRAWINGS

FIG. 3(C) illustrates an effect of ensembles on class imbalance and aggregation bias, in accordance with an example implementation.

DETAILED DESCRIPTION

Figure 1A:
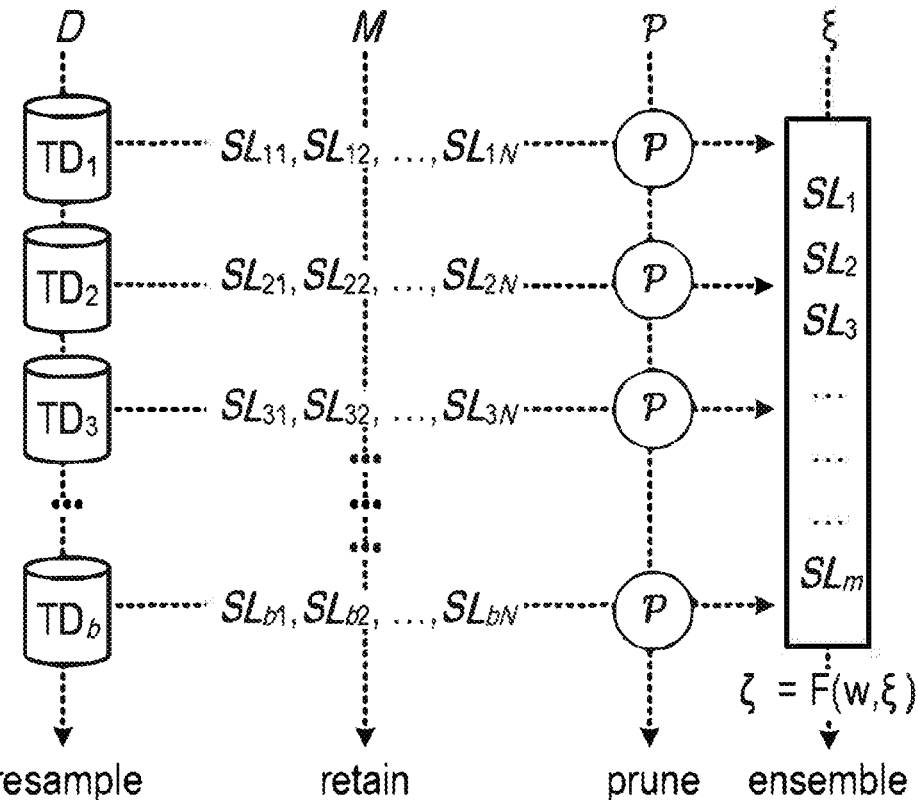
FIG. 1(A) illustrates an overview of the dynamic ensemble model, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve a system that generates an ensemble of DL/NN models for problems modelled as classification tasks, e.g., a system that recommends a course of repair actions after an equipment fails. The system described in the present disclosure is not computationally expensive and leverages existing training algorithms. The system described leads to reduction of effects from representation bias, aggregation bias and Simpson's paradox.

Described below are the definitions used and system/algorithm description to explain that an ensemble of models helps in reducing the effects from representation bias, aggregation bias and Simpson's paradox.

Architecture: An assumption is that the problem to be solved is modelled as a classification problem, e.g., to recommend a course of repair actions. The classification problem is being solved using a Neural Network or Deep Learning. The architecture/base architecture is defined as a stack-up of modules including, but not limited to, convolutional neural networks (CNN), long short-term memory (LSTM), multi-layer fully connected networks (MNN), a combination of all these.

Model: A model is defined as an architecture built for a learning task. Task is the problem being solved and is modelled as a classification problem.

Training process: The process used to find the optimum set of parameters of the model.

Trained learner: A trained learner is the predictor of a model after one training cycle, i.e., it is the set of parameters that is learned after one training cycle. Thus, given a model, it can have multiple trained learners by having multiple training cycles.

Copy of trained learners: Given a model, and one of its trained learners, a copy of the trained learner is the one that trained with the same model setting. Thus, all trained learners of the model can be called a copy of each other provided the model settings is the same.

Inference phase/process: The process of using a trained learner and passing an input through the trained learner.

Representation bias: Representation bias happens from the way systems define and sample from a population. These can be from the input variable side (e.g., more samples from male and less from female) or these can be from the output variable side (e.g., class imbalance for course of repair actions for an input).

Aggregation bias: Aggregation bias happens when false conclusions are drawn for a subgroup based on observing other different subgroups or generally when false assumptions about a population affect the model's outcome and definition. For example, for repair recommendations when the overall accuracy of the model is x %, generally it is assumed that a similar performance is valid for all repair actions. However, not all repair actions are represented equally in the data. Thus, the performance of x % may not be applicable for repair actions that are under-represented, i.e., the ones that are minority group.

Simpson's paradox: According to Simpson's paradox, a trend, association, or characteristic observed in underlying subgroups may be quite different from association or characteristic observed when these subgroups are aggregated. For example, for repair recommendations when the overall accuracy of the model is x %, generally it is assumed that a similar performance is valid for all repair actions. However, not all repair actions are represented equally in the data. Thus, the performance of x % may not be applicable for repair actions that are under-represented, i.e., the ones that are minority group. Another example would be re-training the model multiple number of times for the same dataset. With overall accuracy being similar/the same, but with individual data points producing different outputs for different versions of the re-trained model, such situations can result into different conclusions when compared to aggregate performance of the models. An example conclusion in this case would be that the different models produce similar accuracy, hence all models are similar when re-trained, they are robust, but the fact is that the models are not robust as shown by the different outputs for the same input from the different models.

Example implementations described herein generally are directed to the steps of intelligent sampling of trained learners during the model training process, incorporating trained learners from different subset of training dataset, and combining output from multiple learns to form a single output. To demonstrate the working of the example implementations, an example of recommending course of repair actions or repair recommendation (RR) after a system has failed is used herein.

Recommending repairs involves incorporating information from natural language complaints from users, information regarding the equipment, information regarding the usage of the equipment, sequence of events, and sensor data. Accurate and recommendations that are not affected by representation bias, aggregation bias, and/or Simpson's paradox are important for this application because technicians will ultimately use the recommendations and apply it to the equipment. Recommendations affected by these biases may lead to incorrect repair actions that can be fatal, customer dissatisfaction as well as technician's distrust in the repair recommendation system. To recommend accurate and unbiased repair actions, the following steps should be executed.

Data Preparation

For repair recommendation, the data input is a set of natural language user complaints, information regarding the equipment, information regarding usage (equipment usage) of the equipment (equipment attributes), sensor data, and sequence of events. The repair recommendation model uses neural networks/deep learning algorithms. Several steps are necessary to perform before the data is used as an input to the deep learning algorithm. The example implementations described herein leverage data processing to the repair recommendation systems. For problems other than repair recommendation that are modelled as classification, example—failure prediction/fault detection, the relevant data preparation steps should be applied to the input data before it is ingested in the deep learning algorithm.

As an example, for repair recommendation the following steps are conducted for data preparation: noise/outlier removal from equipment attributes, equipment usage, sensor data; missing data imputation for sensor data; extraction of text from handwritten notes using optical character recognition, extracting text from voice notes using text-to-speech algorithm; special character removal, stop word removal, normalization of abbreviations, normalization of synonyms, text correction, stemming of the extracted text data; and noise removal, removal of repair mistakes from the repair data.

Once data is prepared, it is further divided into the training and validation set. The training set is used during the model training phase, while the validation set is used for evaluating the model.

FIG. 1(A) illustrates an overview of the dynamic ensemble model, in accordance with an example implementation. In the proposed dynamic ensemble model, the proposed method utilizes the following concepts.

Extended bagging: random initialization of parameters, random shuffle of training dataset Snapshot ensemble: sample leaners periodically during training Dynamic pruning: filters good single learners based on a criterion Combination method: method to combine outputs from all components (averaging, weighted averaging, voting, weighted voting).

Furthermore, described below are two additional varients, which are DynSnap-cyc (cyclic decay schedule, cyclic snapshot strategy) and DynSnap-step (step-wise decay schedule, top-N snapshot strategy).

Defining the Base Architecture of the Deep Learning Model

In example implementations described herein the existing concepts in deep learning network architectures are leveraged. These include convolutional neural networks, Long Short-Term Memory (LSTM) networks and fully connected neural networks. As the first step a user-defined base architecture stack-up is created. The base architecture stack-up for this work is defined as the relationship between the inputs, the different layers (convolutional, LSTM, fully connected), relationship between convolutional layer, LSTM layer and fully connected layers. The base architecture involves many architectural hyper-parameters. These include but are not limited to, the number of convolutional layers, number of convolutional filters, convolutional filter size, number of LSTM layers, number of LSTM nodes, number of fully connected layers, number of fully connected hidden nodes, dropout rate at each layer, number of epochs for training, and so on. By using known techniques, these hyper-parameters can be optimized using a training dataset for a single trained learner. The methodology is not for finding the optimum hyper-parameters for a trained learner. If there exists a single trained learner, those hyper-parameter settings can be used as the base architecture stack-up. The base architecture stack-up is equivalent to the model as defined above.

Figure 1B:
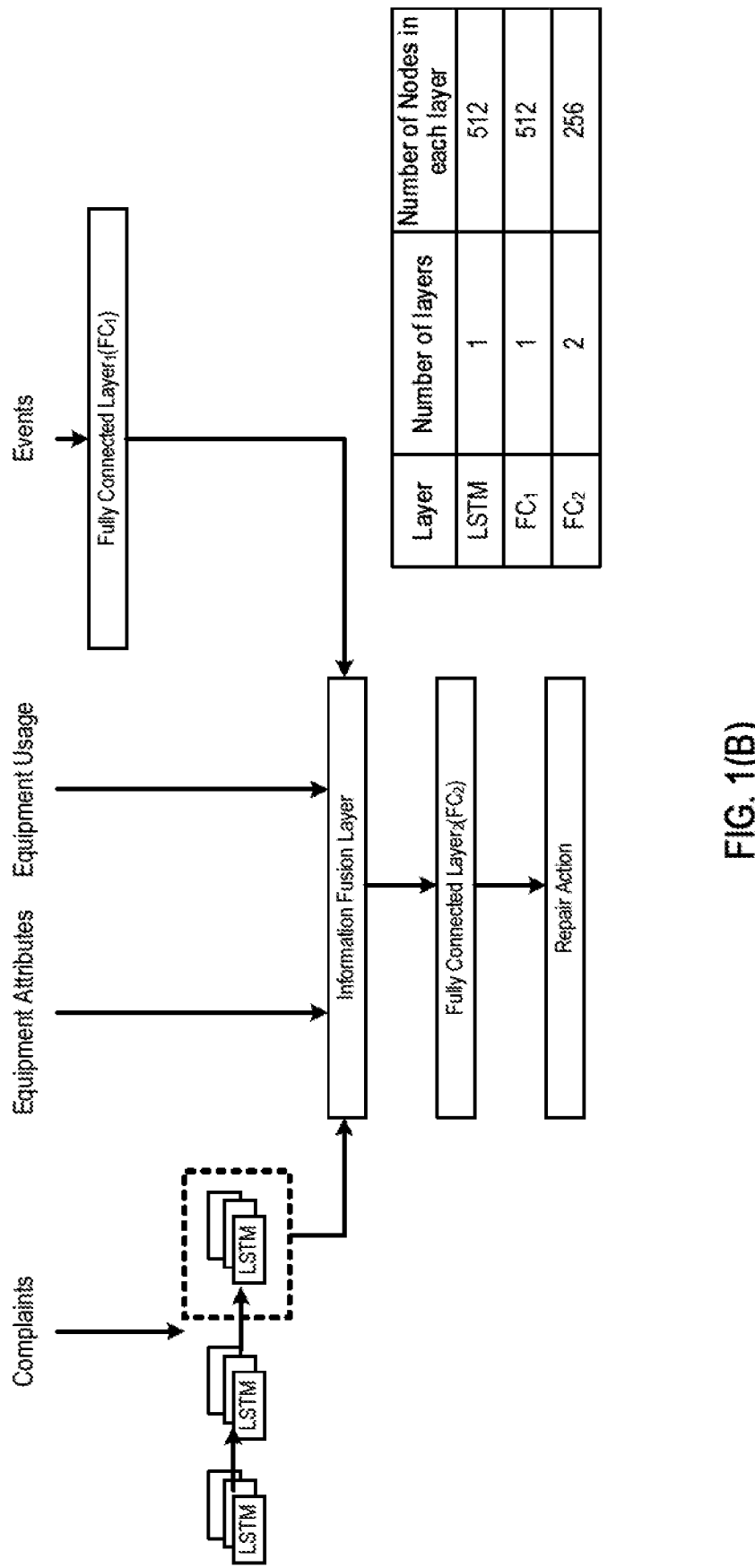
FIG. 1(B) illustrates a base architecture/model example for repair recommendation, in accordance with an example implementation.

FIG. 1(B) illustrates an example base architecture/model for the repair recommendation, in accordance with an example implementation. In the example of FIG. 1(B), the free text user complaints information flows through a LSTM layer, the equipment events flow through a fully connected layer, and finally the output of these layers is combined with the equipment attribute information, equipment usage information which later flows through multiple fully connected layers. FIG. 1(B) illustrates hyper-parameters that were optimized using a training process for a trained learner using existing state-of-the-art methods. This stack-up forms the base architecture/stack-up, i.e., the model. Every time this model is trained using a training dataset, a trained learner is formed with the same hyper-parameters, but with different model parameter values because of the stochasticity in the training process.

Ensemble Learning During the Training Phase

Figure 2:
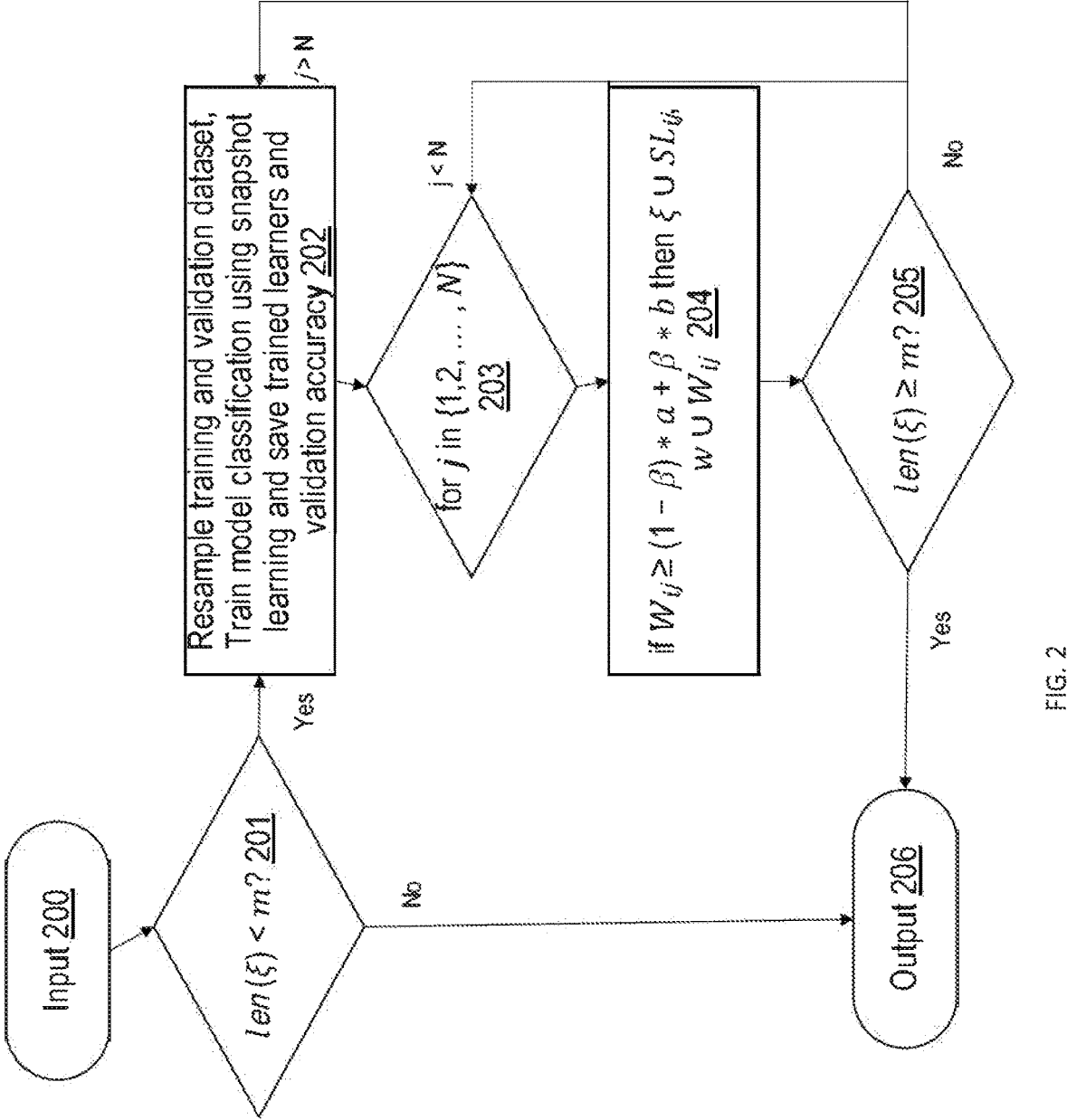
FIG. 2 illustrates an example flow of the algorithm developed to sample trained learners, in accordance with an example implementation.

FIG. 2 illustrates an example flow of the algorithm developed to sample trained learners, in accordance with an example implementation. Example implementations described herein involve a dynamic snapshot ensemble (DynSnap) method by combining extended bagging such as random initialization of model parameters and random shuffle of the training dataset; snapshot ensemble technique where we sample trained learners during the parameter optimization routine; and a dynamic pruning method to select good trained learners from the pool of trained learners available. The algorithm developed to sample trained learner is as follows.

The input is provided at 200. The input 200 can involve a model of the classification problem M; training dataset D; number of ensemble single learners m; number of snapshot trained learners from one training process N; and prune factor β. The output 206 of the algorithm is ensemble learner ζ. In the initial process of the algorithm, the set of ensemble components is set as ξ←∅ and the set of weights of the ensemble components is set as w←∅.

At 201, the algorithm checks if the length of the set of the ensemble components is less than the number of ensemble single learners. If not (No), then the flow proceeds to 206 to provide the output, otherwise (Yes), the flow proceeds to 202.

At 202, the algorithm resamples training and validation dataset $TD_i$ from D. The algorithm trains M on $TD_i$ using snapshot learning, and save trained learners $\xi_i = \{SL_{i1}, \ldots, SL_{iN}\}$, where SL is a single learner. Then, the algorithm saves the validation accuracy $w_i = \{W_{i1}, \ldots, W_{iN}\}$ for $\xi_i$. The algorithm sorts $\xi_i$ in descending order based on $w_i$ wherein $a = \max(w_i)$, $b = \min(w_i)$.

Accordingly, the algorithm starts the pruning process from 203 onwards. At 203, for j in $\{1, 2, \ldots, N\}$, the algorithm processes each j and executes the following loop.

At 204, a determination is made, for the j being evaluated, if $W_{ij} \geq (1-\beta)^*a + \beta$ & b; if so then the saved trained learners are updated with the corresponding single learner $(\xi \cup SL_{ij})$ and the validation accuracy is updated with the corresponding weight $(w \cup W_{ij})$. At 205, a check is made if the length of the saved trained learners is greater than or equal to the number of ensemble single learners. If so (Yes), then the flow proceeds to 206 to produce the output, otherwise (No) the flow proceeds to 203 if there are still j to process, or to 202 if there are no more to process.

To produce the output 206, method F is used to combine output from ensemble components so that $\zeta = F(\xi, w)$. The method can involve majority voting (MV), weighted majority voting (WMV), averaging (AVG), weighted averaging (WAVG), and so on in accordance with the desired implementation.

The above algorithm states the procedure to train the ensemble model in an efficient manner and guarantees that ensemble leads to a reduction of the effects of representation bias, aggregation bias and Simpson's paradox. The pruning step that controls the quality of the components of the ensemble has a major contribution towards this reduction of bias effects, i.e., simply including various models as components of the ensemble will not result into the reduction of bias effects.

Figure 3A:
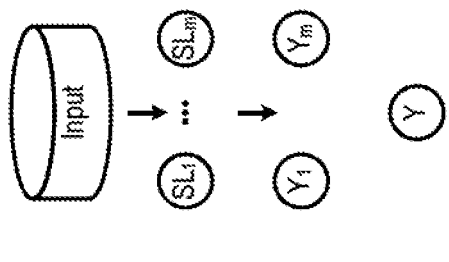
FIG. 3(A) illustrates an ensemble creation process, in accordance with an example implementation.
Figure 3A:
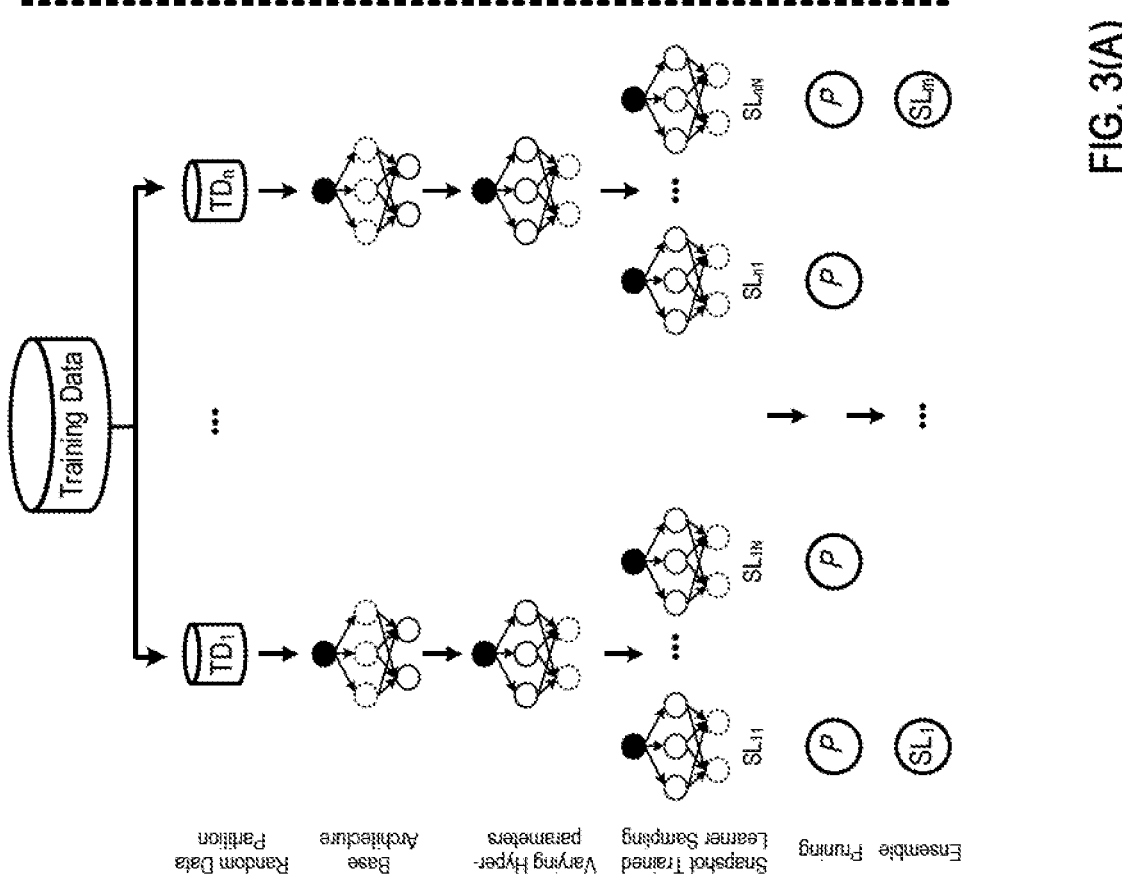

FIG. 3(A) illustrates an ensemble creation process, in accordance with an example implementation. There are two variants of the snapshot scheduling to sample trained learners—cyclic annealing schedule, or step-wise decay schedule. These two variants result into DynSnap-cyc, DynSnap-step method variants respectively. Both variants of the method are effectively in reducing the effects of the biases mentioned. The methodology is also presented in FIG. 3(A).

As described herein, during the inference phase, the input data is received, and pre-processing steps are performed as listed above. Subsequently, the data is passed through each learned component in the ensemble model. Thus, for an input datapoint there will be mm outputs. These outputs are combined using combination function $\mathcal{F}$. The combination function $\mathcal{F}$ can be majority voting (MV), weighted majority voting (WMV), averaging (AVG), weighted averaging (WAVG), etc.

Bias is introduced by data as well as the model and nearly all applications in Industrial AI can suffer because of this. The benefit of the present disclosure is that it can be used without altering the training methodology drastically and with leveraging existing model architecture and definitions. The example implementations described herein will reduce effects of three types of biases—representation bias, aggregation bias and Simpson's paradox. Existing methods either focus on cleaning up the data (which can be impractical) or coming with brand new model architectures that may not be feasible to be deployed. The example implementations can be used as an out-of-box approach with existing models/systems, such as in applications which require prediction of failures, recommending repair actions, defect identification and other predictive maintenance activities for either components of the system or a system as a whole.

Figure 3B:
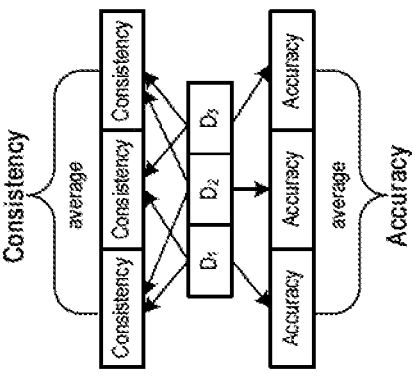
FIG. 3(B) illustrates an example experiment setting using the example implementations described herein.

FIG. 3(B) illustrates an example experiment setting using the example implementations described herein. In the example of FIG. 3(B), three datasets are used to conduct training and testing, with the corresponding models being based on ResNet20, ResNet56, and fastText. In the example of FIG. 3(B), three class imbalanced training datasets are created $D_1$, $D_2$, $D_3$ where $D_1 \subseteq D_2 \subseteq D_3$. Testing dataset I is independent of training data and covers the minimum number of classes in any of the three training sets. Validation dataset is sampled by $D_i$ and has same sample size and class distribution as I. Accuracy is determined based on the average of individual accuracy on $D_1$, $D_2$, $D_3$. (Correct-) consistency is defined as average of three values computed using any two from $D_1$, $D_2$, $D_3$.

Various methods are used for comparison as follows. SingleBase is the single learner using original learning procedure. ExtBagging combines m single learners using original learning procedure with random initialization and shuffle of training dataset. Snapshot combines m single learners from DynSnap-cyc learning without pruning ($\beta$=1). DynSnap-cyc combines m single learners from DynSnap-cyc learning with dynamic pruning. DynSnap-step combines m single learners from DynSnap-step learning with dynamic pruning.

FIG. 3(C) illustrates an effect of ensembles on class imbalance and aggregation bias, in accordance with an example implementation. In the example of FIG. 3(C), dataset1 and dataset2 used in FIG. 3(B) are used for the experiments in FIG. 3(C). The classes are divided into two subgroups, in which the majority subgroup is the group of classes for which the frequencies add up to a threshold of $\tau$, when the classes are in descending order based on frequencies. The minority subgroup are all the other classes. In the example of FIG. 3(C), $\tau$=0.8 is considered for dataset1 and $\tau$=0.9 is considered for dataset2. Aggregation bias happens when false conclusions are drawn for a subgroup based on observing other different subgroups, or generally when false assumptions about a population affect the model's outcome and definition. Class imbalance can introduce such biases. By improving performance using ensembles, such biases can thereby be reduced.

Figure 3D:
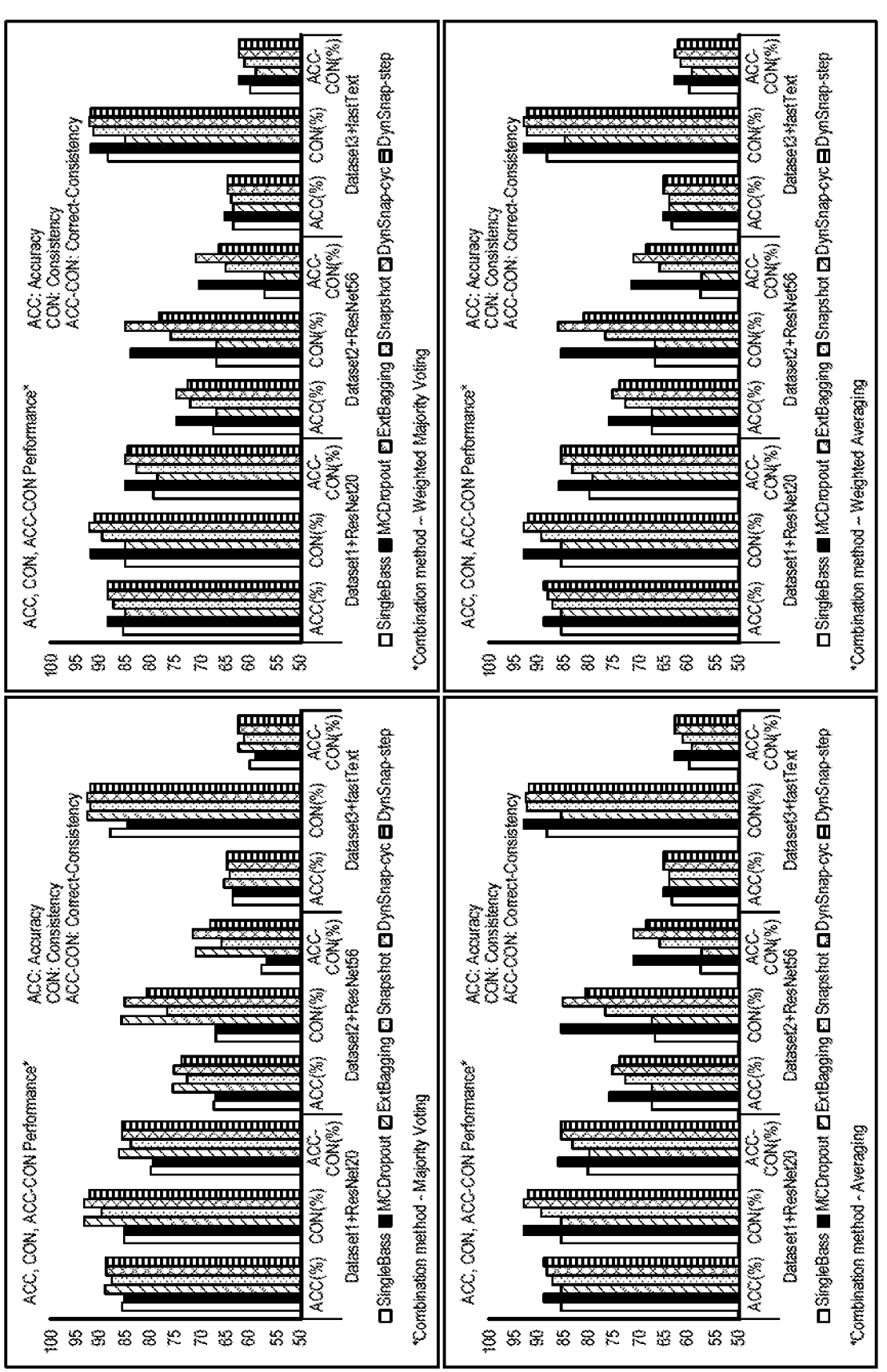
FIG. 3(D) illustrates an example effect of ensembles on Simpson's paradox in accordance with the example implementations described herein.

FIG. 3(D) illustrates an example effect of ensembles on Simpson's paradox in accordance with the example implementations described herein. When deep learning models are retrained, there is a possibility to have similar overall performance, but the performance of individual sub-groups (individual classes) may not remain the same. In such a scenario, when performance of individual data points changes (a much harsher condition), then Simpson's paradox and (correct-) consistency have similar meaning.

Ensembles consistently outperforms the methods with a single learner for all metrics and all datasets. As illustrated in FIG. 3(D), the CON improvements are 1.8%-3.3% (dataset1), 5.4%-8.3% (dataset2), 0.7%-2% (dataset3). The ACC-CON improvements are 3.7%-6.5% (dataset1), 8.3%-14.1% (dataset2), 1.4%-2.3% (dataset3).

Figure 4:
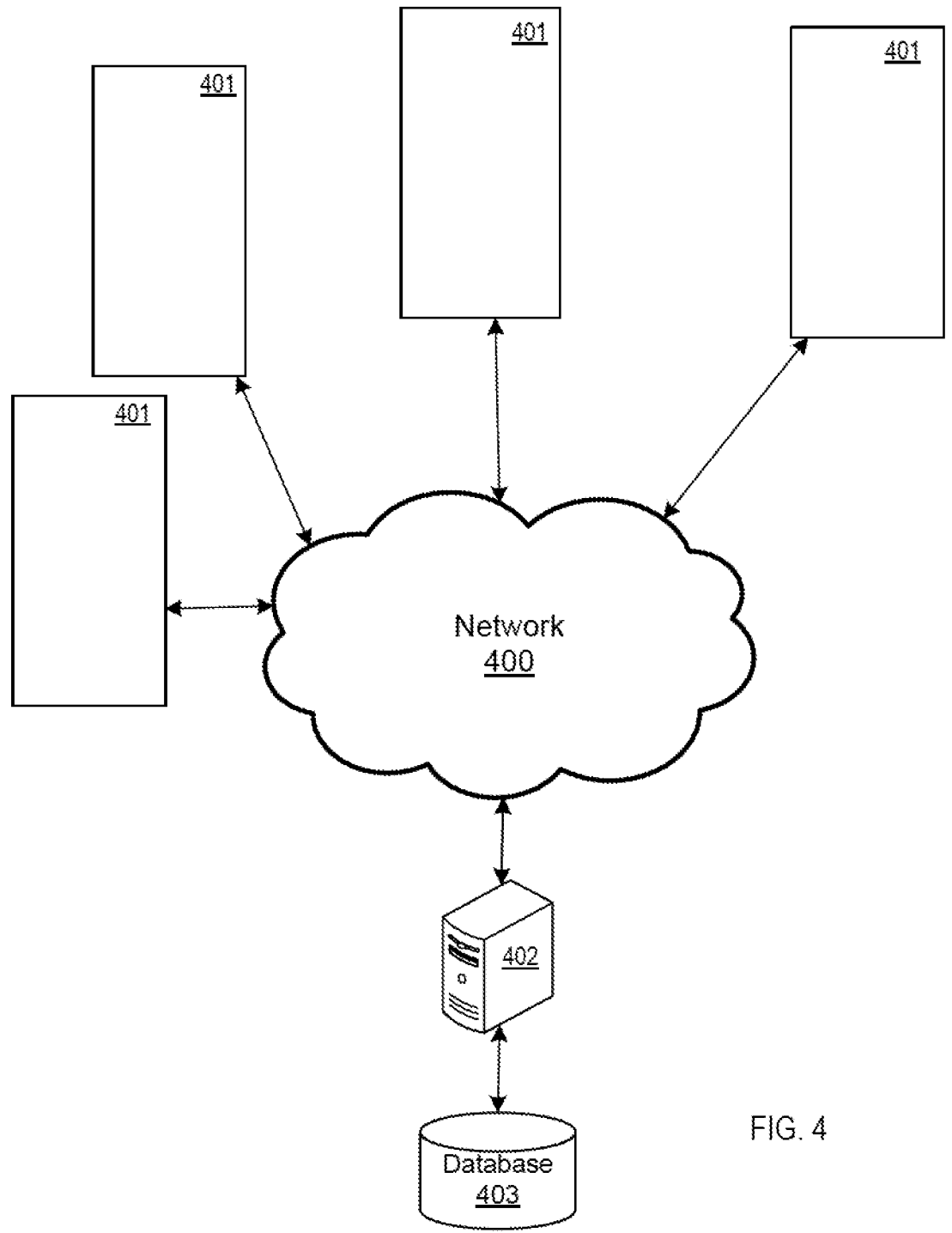
FIG. 4 illustrates a system involving a plurality of physical systems networked to a management apparatus, in accordance with an example implementation.

FIG. 4 illustrates a system involving a plurality of physical systems networked to a management apparatus, in accordance with an example implementation. One or more physical systems 401 integrated with various sensors are communicatively coupled to a network 400 (e.g., local area network (LAN), wide area network (WAN)) through the corresponding network interface of the sensor system installed in the physical systems 401, which is connected to a management apparatus 402. The management apparatus 402 manages a database 403, which contains historical data collected from the sensor systems from each of the physical systems 401. In alternate example implementations, the data from the sensor systems of the physical systems 401 can be stored to a central repository or central database such as proprietary databases that intake data from the physical systems 401, or systems such as enterprise resource planning systems, and the management apparatus 402 can access or retrieve the data from the central repository or central database. The sensor systems of the physical systems 401 can include any type of sensors to facilitate the desired implementation, such as but not limited to gyroscopes, accelerometers, global positioning satellite (GPS), thermometers, humidity gauges, or any sensors that can measure one or more of temperature, humidity, gas levels (e.g., CO2 gas), and so on. Examples of physical systems can include, but are not limited to, shipping containers, lathes, air compressors, and so on. Further, the physical systems can also be represented as virtual systems, such as in the form of a digital twin.

In example implementations described herein, the management apparatus 402 may deploy one or more machine learning models such as the model ensemble described herein to intake sensor data from the physical systems 401. Depending on the analysis from the machine learning models, management apparatus 402 may control the one or more physical systems 401 accordingly. For example, if the analysis indicates that one of the physical systems 401 needs to be shut down or reoriented, management apparatus 402 may control such a physical system to be shut down, reconfigured, or reoriented in accordance with the desired implementation.

Figure 5:
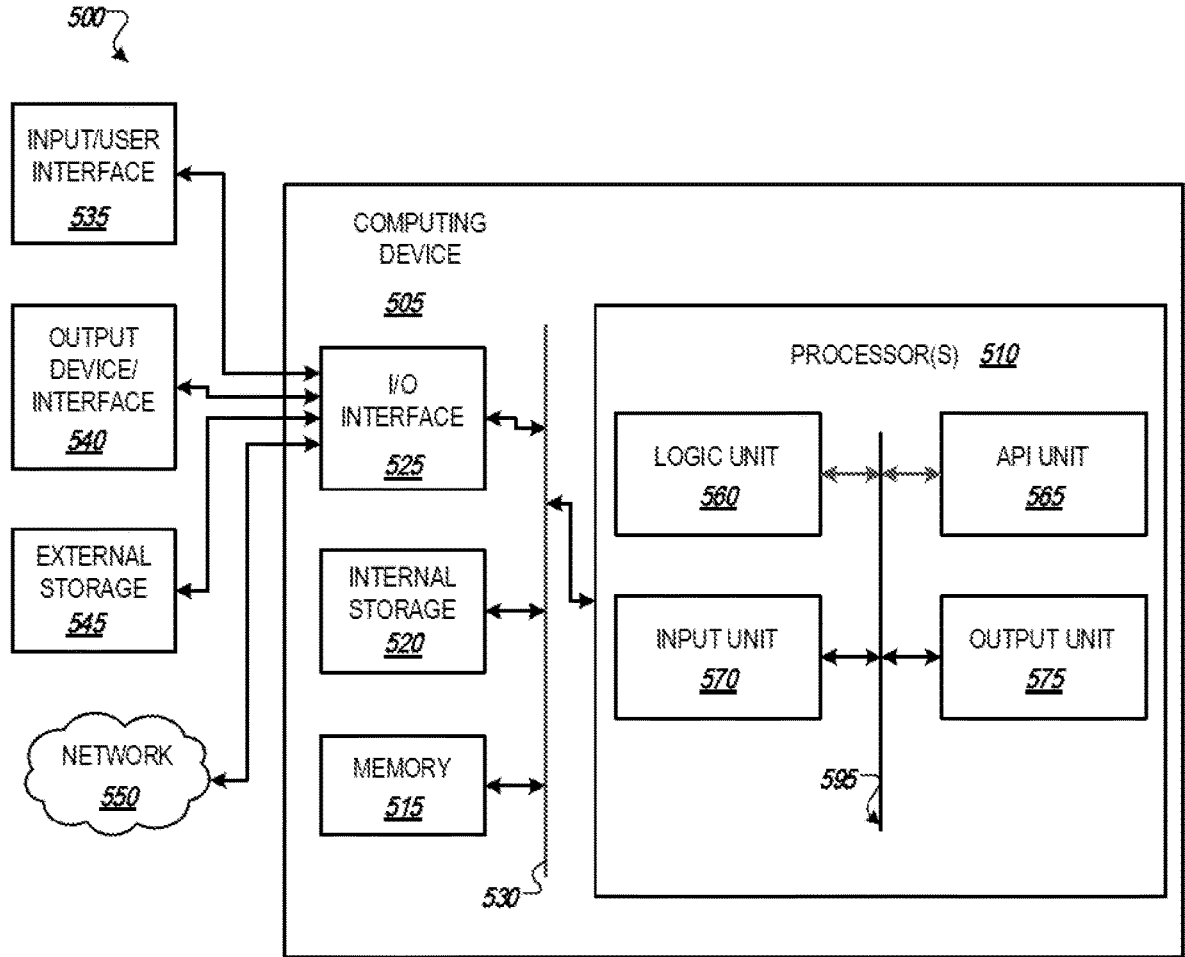
FIG. 5 illustrates an example computing environment with an example computer device suitable for use in some example implementations.

FIG. 5 illustrates an example computing environment with an example computer device suitable for use in some example implementations, such as a management apparatus 402 as illustrated in FIG. 4. Computer device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in the computer device 505. I/O interface 525 is also configured to receive images from cameras or provide images to projectors or displays, depending on the desired implementation.

Computer device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 540 may include a display, television, monitor, printer, speaker, braille, or the like. In some example implementations, input/user interface 535 and output device/interface 540 can be embedded with or physically coupled to the computer device 505. In other example implementations, other computer devices may function as or provide the functions of input/user interface 535 and output device/interface 540 for a computer device 505.

Examples of computer device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 505 can be communicatively coupled (e.g., via I/O interface 525) to external storage 545 and network 550 for communicating with any number of networked components, devices, and systems, including one or more computer devices of the same or different configuration. Computer device 505 or any connected computer device can be functioning as, providing services of, or referred to as a server, client, thin server, general machine, special-purpose machine, or another label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computer device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, and inter-unit communication mechanism 595 for the different units to communicate with each other, with the OS, and with other applications (not shown). The described units and elements can be varied in design, function, configuration, or implementation and are not limited to the descriptions provided. Processor(s) 510 can be in the form of hardware processors such as central processing units (CPUs) or in a combination of hardware and software units.

In some example implementations, when information or an execution instruction is received by API unit 565, it may be communicated to one or more other units (e.g., logic unit 560, input unit 570, output unit 575). In some instances, logic unit 560 may be configured to control the information flow among the units and direct the services provided by API unit 565, input unit 570, output unit 575, in some example implementations described above. For example, the flow of one or more processes or implementations may be controlled by logic unit 560 alone or in conjunction with API unit 565. The input unit 570 may be configured to obtain input for the calculations described in the example implementations, and the output unit 575 may be configured to provide output based on the calculations described in example implementations.

Processor(s) 510 can be configured to execute methods or instructions for generating a model ensemble to reduce bias. Such a method can involve training a plurality of machine learning models from data (e.g., training the learners at 202 of FIG. 2), each of the plurality of machine learning models trained from a first subset of the data and validated from a second subset of the data as described at 202, each of the first subset and the second subset being different for each of the plurality of machine learning models; determining the accuracy of each of the plurality of machine learning models based on validation against the second subset of the data; pruning the plurality of machine learning models based on the accuracy to generate a subset of the plurality of machine learning models; and forming the model ensemble from the subset of the plurality of machine learning models as illustrated from the flows of 203 to 206 of FIG. 2. Depending on the desired implementation, the plurality of machine learning models can be neural network models such as convolutional neural networks (CNN), recurrent neural networks (RNN) and so on in accordance with the desired implementation.

Processor(s) 510 can be configured to execute the methods or instructions as described above, wherein forming the model ensemble from the subset of the plurality of machine learning models can involve weighing each of the subset of the plurality of machine learning models based on the accuracy to form the model ensemble as described with respect to FIG. 2.

Processor(s) 510 can be configured to execute the method or instructions as described herein, wherein the pruning the plurality of machine learning models based on the accuracy to generate a subset of the plurality of machine learning models involves incorporating ones of the plurality of machine learning models having the accuracy being greater or equal to a sum of a first value and a second value for the model ensemble into the subset of the plurality of machine learning models, the first value derived from a first prune factor and a maximum accuracy determined from the each of the plurality of machine learning models and a second value derived from a second prune factor and a minimum accuracy determined from the each of the plurality of values as described with respect to 204 of FIG. 2.

Processor(s) 510 can be configured to execute the methods or instructions as described herein, wherein the training the plurality of machine learning models is conducted from sampling of snapshots of the data according to a snapshot scheduling. Such a snapshot scheduling can involve a snapshot of historical sensor data as stored in database 403, or otherwise in accordance with the desired implementation. Examples of the snapshot scheduling can involve a cyclical annealing schedule, and/or a step-wise decay schedule as described with respect to FIG. 3(A) to 3(D).

Processor(s) 510 can be configured to execute the methods or instructions as described herein, wherein the training the plurality of machine learning models from the data can involve resampling the first subset of data and the second subset to generate additional machine learning models as described with respect to 202 of FIG. 2. Through this manner, additional learnings can be considered.

Processor(s) 510 can be configured to execute the method or instructions as described herein wherein the training the plurality of machine learning models from the data can involve randomizing hyperparameters used for training the plurality of machine learning models based on the flow at 202 as described with respect to FIG. 2. In this manner, learners can be generated through randomizing hyperparameters to ensure that learners are appropriately formed for bias reduction.

Processor(s) 510 can be configured to execute the method or instructions as described herein, wherein the bias is one or more of representation bias, aggregation bias, or Simpson's paradox as described herein.

As described herein and as illustrated in FIG. 4, the data in question can be sensor data or Internet of Things (IoT) data. The example implementations described herein can be integrated in any IoT system such as industrial IoT, edge sensor systems connected to a gateway, and so on in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for generating a model ensemble to reduce bias and control operation of a physical system, the method comprising:
   receiving sensor data from the physical system:
   training a plurality of machine learning models from data comprising the sensor data from the physical system, each of the plurality of machine learning models trained from a first subset of the data and validated from a second subset of the data, each of the first subset and the second subset being different for each of the plurality of machine learning models;
   determining accuracy of each of the plurality of machine learning models based on validation against the second subset of the data;
   pruning the plurality of machine learning models based on the accuracy to generate a subset of the plurality of machine learning models; and
   forming the model ensemble from the subset of the plurality of machine learning models;
   deploying the model ensemble to predict maintenance actions for the physical system based on the sensor data; and
   automatically controlling the physical system based on predictions from the model ensemble.

2. The method of claim 1, wherein the plurality of machine learning models are neural network models.

3. The method of claim 1, wherein the forming the model ensemble from the subset of the plurality of machine learning models comprises weighing each of the subset of the plurality of machine learning models based on the accuracy to form the model ensemble.

4. The method of claim 1, wherein the pruning the plurality of machine learning models based on the accuracy to generate a subset of the plurality of machine learning models comprises incorporating ones of the plurality of machine learning models having the accuracy being greater or equal to a sum of a first value and a second value for the model ensemble into the subset of the plurality of machine learning models, the first value derived from a first prune factor and a maximum accuracy determined from the each of the plurality of machine learning models and a second value derived from a second prune factor and a minimum accuracy determined from the each of the plurality of values.

5. The method of claim 1, wherein the training the plurality of machine learning models is conducted from sampling of snapshots of the data according to a snapshot scheduling.

6. The method of claim 5, wherein the snapshot scheduling is a cyclical annealing schedule.

7. The method of claim 5, wherein the snapshot scheduling is a step-wise decay schedule.

8. The method of claim 1, wherein the training the plurality of machine learning models from the data comprises resampling the first subset of data and the second subset to generate additional machine learning models.

9. The method of claim 1, wherein the training the plurality of machine learning models from the data comprises randomizing hyperparameters used for training the plurality of machine learning models.

10. The method of claim 1, wherein the bias is one or more of representation bias, aggregation bias, or Simpson's paradox.

11. The method of claim 1, wherein the data comprises sensor data or Internet of Things (IOT) data.

12. A non-transitory computer readable medium, storing instructions for generating a model ensemble to reduce bias and control operation of a physical system, the instructions comprising:

receiving sensor data from the physical system;

training a plurality of machine learning models from data comprising the sensor data from the physical system, each of the plurality of machine learning models trained from a first subset of the data and validated from a second subset of the data, each of the first subset and the second subset being different for each of the plurality of machine learning models;

determining accuracy of each of the plurality of machine learning models based on validation against the second subset of the data;

pruning the plurality of machine learning models based on the accuracy to generate a subset of the plurality of machine learning models; and forming the model ensemble from the subset of the plurality of machine learning models;

deploying the model ensemble to predict maintenance actions for the physical system based on the sensor data; and automatically controlling the physical system based on predictions from the model ensemble.

13. An apparatus for controlling operation of a physical system, comprising:

a processor, configured to:

receive sensor data from the physical system;

train a plurality of machine learning models from data comprising the sensor data from the physical system, each of the plurality of machine learning models trained from a first subset of the data and validated from a second subset of the data, each of the first subset and the second subset being different for each of the plurality of machine learning models;

determine accuracy of each of the plurality of machine learning models based on validation against the second subset of the data;

prune the plurality of machine learning models based on the accuracy to generate a subset of the plurality of machine learning models; and form a model ensemble from the subset of the plurality of machine learning models;

deploy the model ensemble to predict maintenance actions for the physical system based on the sensor data; and automatically control the physical system based on predictions from the model ensemble.

* * * * *